United States Patent
Lubinski et al.

(10) Patent No.: US 6,418,273 B1
(45) Date of Patent: Jul. 9, 2002

(54) VIDEO COMPACT DISC PLAYER

(75) Inventors: Joseph Lubinski, Cupertino; Saul B. Jodel, Burlingame, both of CA (US)

(73) Assignee: The Original San Francisco Toymakers, South San Francisco, CA (US)

( * ) Notice: Subject to any disclaimer, the term of this patent is extended or adjusted under 35 U.S.C. 154(b) by 0 days.

(21) Appl. No.: 09/391,148

(22) Filed: Sep. 7, 1999

(51) Int. Cl.[7] .............................................. H04N 5/781
(52) U.S. Cl. ...................... 386/125; 386/124; 386/126
(58) Field of Search .............................. 386/125–126, 386/96, 94, 124, 105–106, 112; 345/55, 102, 147, 155, 205, 206, 173; 348/792, 793; H04N 5/781

(56) References Cited

U.S. PATENT DOCUMENTS

| | | | | |
|---|---|---|---|---|
| 5,309,249 A | * | 5/1994 | Ishii | 386/126 |
| 5,329,590 A | * | 7/1994 | Pond | 380/242 |
| 5,386,577 A | * | 1/1995 | Zenda | 713/340 |
| 5,485,280 A | | 1/1996 | Fujinami et al. | 358/335 |
| 5,510,902 A | | 4/1996 | Fujinami et al. | 358/335 |
| 5,594,552 A | | 1/1997 | Fujinami et al. | 386/131 |
| 5,655,051 A | | 8/1997 | Furuta et al. | 386/105 |
| 5,666,451 A | | 9/1997 | Kim | 386/97 |
| 5,712,949 A | * | 1/1998 | Kato et al. | 386/96 |
| 5,761,516 A | * | 6/1998 | Rostoker et al. | 710/260 |
| 5,809,203 A | | 9/1998 | Hwangbo | 386/70 |
| 5,812,683 A | * | 9/1998 | Parker et al. | 381/74 |
| 5,838,824 A | | 11/1998 | Narikawa et al. | 382/232 |
| 5,899,575 A | | 5/1999 | Okayama et al. | 386/46 |
| 5,914,707 A | * | 6/1999 | Kono | 345/173 |
| 6,058,241 A | | 5/2000 | Kawamura et al. | 386/68 |

FOREIGN PATENT DOCUMENTS

| | | | |
|---|---|---|---|
| EP | 0 715 459 A2 | 6/1996 | H04N/5/76 |
| EP | 0 762 756 A2 | 3/1997 | H04N/5/775 |
| EP | 0 903 742 A2 | 3/1999 | G11B/27/034 |
| GB | 2 287 345 | 9/1995 | G07F/17/00 |
| GB | 2 320 637 | 6/1998 | H04N/5/907 |
| JP | 9-182016 | 7/1997 | H04N/5/907 |
| JP | 9-233429 | 9/1997 | H04N/5/92 |

(List continued on next page.)

OTHER PUBLICATIONS

"Compression Technology: an MPEG Overview," *C–Cube Microsystems: MPEG Technical Overview*, 1999, http://www.c-cube.com/technology/mpeg.html.

(List continued on next page.)

*Primary Examiner*—Vincent Boccio
(74) *Attorney, Agent, or Firm*—Fliesler Dubb Meyer & Lovejoy LLP

(57) ABSTRACT

A portable video compact disc player capable of playing both audio compact discs and MPEG-1 video compact discs is provided. A system control determines the type of signal that is being produced from the disc and controls the processing of that signal. If the signal is audio the system control directs the audio out to the speakers or alternative audio output ports. If the information is encoded MPEG-1 audio/video the system control sends the signal to the digital signal processing section. The digital signal processing section produces an MPEG-1 audio signal and a MPEG-1 video signal. This information is further processed and decoded by an MPEG audio/video processor then sent directly to a display screen through a control circuit board. The power consumed is minimized by reducing the number of semiconductor devices used to display the signal and by limiting the power supplied to the backlight when the device is being operated on DC power. Limiting the amount of semiconductor devices reduces the overall size of the VCD player and reduces the cost of manufacturing. The arrangement of the semiconductor devices also minimizes the electromagnetic radiation.

26 Claims, 6 Drawing Sheets

FOREIGN PATENT DOCUMENTS

| | | | |
|---|---|---|---|
| JP | 10-117324 | 5/1998 | ............ H04N/5/92 |
| JP | 10-269706 | 10/1998 | ............ G11B/20/10 |
| JP | 11-069296 | 3/1999 | ............ H04N/5/91 |
| WO | WO 97/10679 | 3/1997 | ............ H04N/9/87 |
| WO | WO 97/23093 | 6/1997 | ............ H04N/5/92 |
| WO | WO99/12348 | 3/1999 | ............ H04N/5/92 |
| WO | WO 00/07368 | 2/2000 | .......... H04N/5/775 |

OTHER PUBLICATIONS

"MPEG–1 Technology for Consumer Electronics," *C–Cube Microsystems—Technology*, 1999, http://www.c–cube.com/technology/videocd.html.

"Matsushita Develops Single–Chip MPEG2 Video Encoder LSI For Portable Consumer–Use Multimedia Product," *MECA Press Release—Panasonic To Provide HDTV And Digital TV Products*, 1998, http://www.panasonic.com/MECA/press_releases/meca_pr_98.2.5.html.

"Incredible Video Resolution," *Panasonic DVD Video Technology Page*, 1998, http://www.panasonic.com/consumer_electronics/dvd/video.htm.

"Palm Theater: The First Portable DVD Theater In The World," *Panasonic DVD–L10 Page*, 1998, http://www.panasonic.com/consumer_electronics/dvd/dvd110.htm.

"Panasonic Ships DVD–RAM Drives," *DVD–RAM—Press Releases—Panasonic Corporate Systems Sales Company*, Aug. 1998, http://www.panasonic.com/host/dvd_ram/press/panasonic_business.html.

"Single–Chip Video Encoder Chips and Development Boards," *DVD–RAM—Press Releases—Panasonic*, Aug. 21, 1998, http://www.panasonic.com/host/dvd_ram/press/masca.html.

* cited by examiner

VIDEO COMPACT DISC PLAYER

FIELD OF THE INVENTION

The present invention relates to providing audio and/or video, and more particularly to a compact disc player.

BACKGROUND OF THE INVENTION

Currently, digital video and audio is recorded on compact discs using compression technology created by the Moving Picture Experts Group (hereinafter referred to as "MPEG"). This working group was formed by the International Standards Organization and the International Electrotechnical Commission (hereinafter referred to as "ISO/IEC") to ensure interoperability between different manufacturer's CD players and the many titles from content producers. The resulting standard is officially known as ISO/IEC, Coded Representation of Picture, Audio and Multimedia/hypermedia Information, ISO 1172. More commonly known as MPEG-1. MPEG-1 focuses on the delivery of video within the constraints of the compact disc, $1/4_{16}$ megabits per second. By using MPEG-1 technology, a full motion image and audio that is about 74 minutes long can be stored on a 12 cm diameter compact disc. The MPEG-1 information stored on a video compact disc (hereinafter referred to as "VCD") can then be decompressed to produce a video signal and audio signal on a VCD player.

As is understood by one of ordinary skill in the art, FIG. 1 displays standard components of a VCD player. Motor Drivers 130 are used to rotate the VCD 120 so that the MPEG-1 encoded information stored on the VCD can be accessed in order to produce audio and video on a display 1300.

An optical pickup 140 reads the MPEG-1 information off of the VCD 120. The Servo 150 controls the motor drivers 130, via line 115, to provide a constant stream of digital information 100 through line 101. A Digital signal processor ("DSP") 160 receives the digital information 100 through line 103 and further processes the signal providing a digitally processed signal 104 to the MPEG audio/video decoder 190, through line 107. The MPEG audio/video decoder 190 decompresses the digitally processed signal 104, and produces an audio signal 102 and a video signal 106. The audio signal 102 is sent to the speaker 180*a* and/or the audio output ports 180*b*, through line 105. A video amplifier 1000 receives the video signal 106 from the MPEG audio/video decoder 190 via line 109. The video amplifier 1000 converts the video signal 106 and provides an analog signal 108 to the video signal processor 1200 through line 111. This analog signal 108 is converted into a digital display signal 110 which is provided to a display panel 1300 through line 113. A switching power supply 1100 provides power through line 119 to the video signal processor 1200. A backlight module 1400 is used to illuminate the display panel 1300 through line 117 to enable viewing of the information.

FIG. 2 illustrates an expanded view of 190, 1000, 1100, 1200, 1300 and 1400 and their interconnections as illustrated in FIG. 1. The MPEG audio/video decoder 190 provides a composite video bit stream 106*a* and a S-video bit stream 106*b* on lines 109*a* and 109*b* respectively. A video amplifier 1000 converts the signals provided from the MPEG audio/video processor 190 and provides an analog R signal, G signal, B signal, C synchronization signal, X synchronization signal, and Y synchronization signal on lines 111R, 111G, 111B, 111C, 111X, and 111Y. An A/D converter 220, located within the video signal decoder 1200, receives the R signal, G signal, and B signal and produces a 6 bit data stream 202 which is sent to the control IC 230, through line 201. The control IC 230 receives the data stream 202, the C synchronization signal, X synchronization signal, and Y synchronization signal via lines 201, 111C, 111X, and 111Y respectively. The control IC 230 produces a Y driver control signal 204, a X driver control signal 206, and a data stream 208. These display signals are sent to the X driver 250*a* and Y driver 250*b* via lines 203, 205, and 207, respectively. A switching power supply 1100 provides a $V_r$ on line 119*a* and a $V_{ee}$ on line 119*b* to a power supply circuit 240 contained within the video signal processor 1200. The power supply circuit provides the necessary power to the X driver 250*a* and the Y driver 250*b*, through lines 209, and 211, in order to power the corresponding pixels on the screen 260. The X driver 250*a*, the Y driver 250*b* and the screen 260 are all located on display panel 1300. A backlight module 1400 is used to provide illumination to the screen 260 to enable viewing of the information, through line 117.

There are a number of disadvantages with the current VCD player. First, the design is complex. In the current VCD player the digital decoded signal 106 from the MPEG audio/video decoder 190 cannot be sent directly to the display. Therefore the digital signal 106 must be further processed to an analog signal 111 which requires more power thereby limiting the amount of play time when using a DC power source. Second, the extra conversion and processing of the signal read from the VCD degrades picture/sound quality. Third, the large number of semiconductor devices necessary to operate the current VCD player add to the overall size of the device. Fourth, the connections between these extra semiconductor devices emits unwanted electromagnetic radiation which is regulated by the FCC and must be kept at a minimum. Fifth, the amount of power being used by the backlight which will reduce the play life of the device when using DC power is not controlled. Sixth, current VCD players do not have a way of decoding VCD's which are copy protected. Seventh, the cost of the current VCD player is high due to the large number of semiconductor devices and expensive components.

Therefore, it is desirable to produce a VCD player which solves the above disadvantages and to present an inexpensive VCD player that enables extended battery life and produces a minimum of electromagnetic radiation. Also, a VCD player which also plays either audio CD's or decodes copy protected VCD's is desirable.

SUMMARY OF THE INVENTION

An embodiment of the present invention provides an apparatus capable of playing either audio compact discs or VCD's. Furthermore the apparatus has been configured to minimize the amount of semiconductor devices used and the distance between them, thereby making the apparatus portable, inexpensive and extending the life of the power supply.

An embodiment of the inventive apparatus includes a motor for rotating the compact disc, a digital read path for obtaining a digital signal from the compact disc and a display device for outputting the video portion of the digital signal. The digital read path includes, among other things, an optical pickup for obtaining a readout signal from the compact disc, a system control for determining whether the readout signal supplied from the optical pickup contains MPEG-1 audio/video and for selecting the destination of the readout signal. A digital signal processor processes the readout signal supplied from the optical pickup and provides an audio signal and a video signal. A MPEG audio/video decoder processes the video signal supplied from the digital signal processor. A digital control circuit is coupled to the MPEG audio/video decoder and supplies a digital signal to the display. A backlight module is connected to the display for controlling the amount of power sent to the display.

The inventive apparatus thus provides a reduced number of semiconductor devices to perform the desired result of displaying a full motion picture onto a display screen. This reduction in the number of semiconductor devices reduces the overall size of the apparatus and limits the amount of connections between devices. Reducing the amount of connections between semiconductor devices limits the amount of unwanted electromagnetic radiation, which must be kept at a minimum as required by the Federal Communications Commission ("FCC"). Not only does the reduction in the number of devices reduce the overall size and limit unwanted radiation it further improves the quality and desirability of the operation of the device by both limiting the amount of power needed to drive the device and improving the quality of the audio/video signal. By using a smaller number of semiconductor devices to process the signal you further limit the unwanted introduction of white noise that is generated during signal modification and amplification. By limiting the noise you can produce a more accurate and clearer audio/video signal.

The power to the device is conserved in at least three ways. First, the power needed to drive the device is reduced due to the reduction of the semiconductor devices used to process the signal. Secondly, the power is conserved by the use of the backlight sensor. The backlight sensor detects whether the apparatus is using AC or DC power. If the device is using DC power the backlight sensor will limit the amount of power that is provided to the display to approximately ⅔ of the maximum output. This reduction in backlight will have a minimal effect on the display quality and conserve battery life. Power is also conserved by the use of a sensor which monitors power source and disables the DC power (batteries) when AC power is available. By selecting the AC power over DC this conserves battery life by only drawing DC power when necessary.

BRIEF DESCRIPTION OF THE FIGURES

These features and embodiments of the present invention will become clear from the following description taken in conjunction with the preferred embodiments thereof with reference to the accompanying drawings throughout which like parts are designated by like reference numerals, and in which.

DETAILED DESCRIPTION

Figure 3:
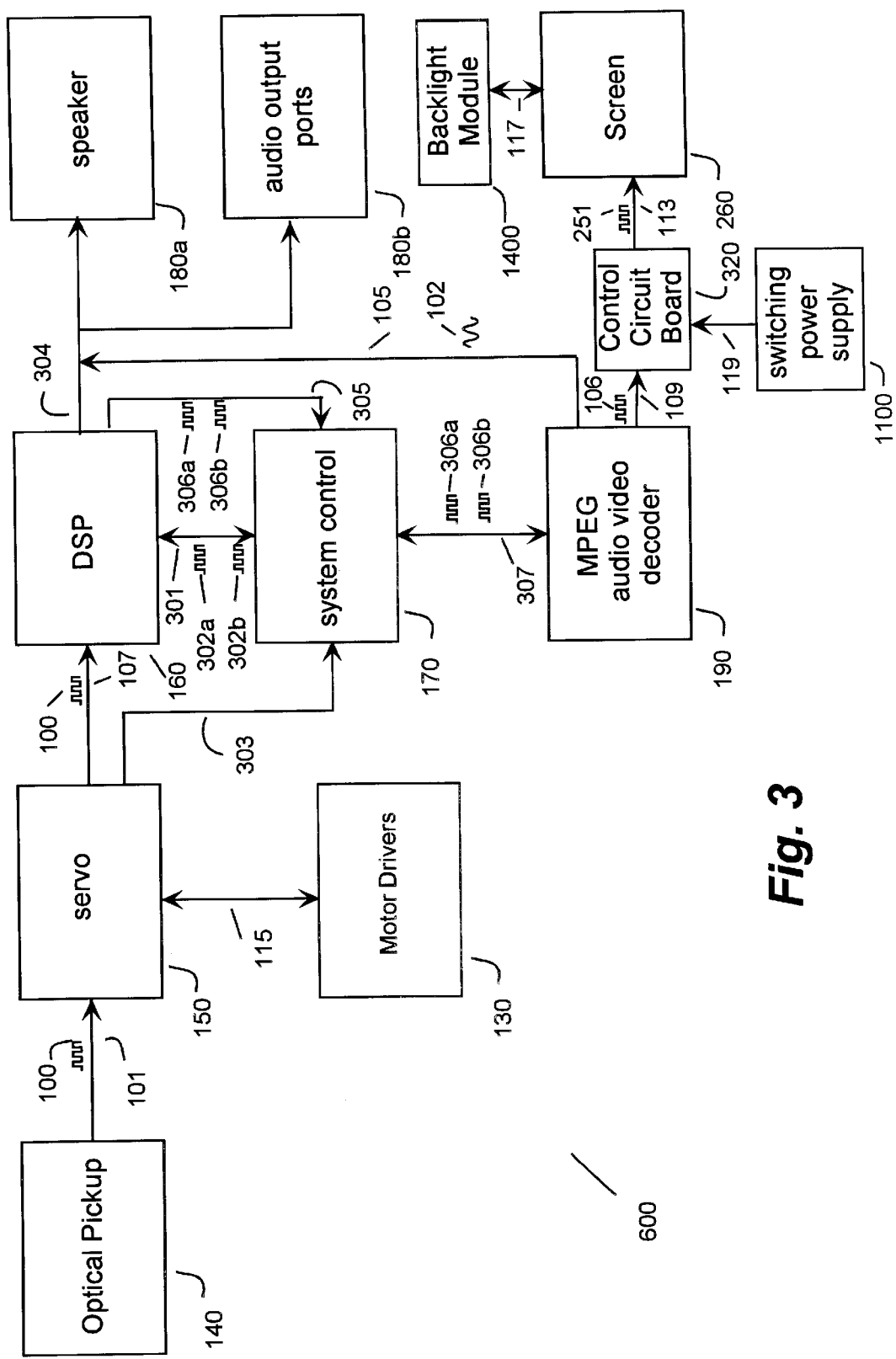
FIG. 3 is a block diagram of a VCD player in accordance with an embodiment of the present invention.

Referring to FIG. 3, an embodiment of an apparatus for reproducing information obtained from a compact disc is shown. In particular, FIG. 3 illustrates a block diagram of a video compact disc player 600 according to an embodiment of the present invention. A compact disc (not shown) 12 cm in diameter, which contains either audio or encoded MPEG-1 audio/video is rotated by the motor drivers 130. As is understood by one of ordinary skill in the art, the motor drivers comprise a spindle motor for rotating a compact disc, and a traverse motor for positioning the optical pickup 140 in relation to the disc to read off digital information 100. The servo 150 controls the operation of the motor drivers 130, via line 115, to provide a constant stream of digital information 100 through line 101. In an embodiment the servo 150 is a Sony CXD 2585+CXA 2549, available from Sony Electronics, Inc. of North America, or BA6392, available from Burr-Brown Corporation, Tuscon, Ariz.

A system control 170 determines the type of information 100 that is being read from the disc via line 303 and selects the destination of the information 100. If the information 100 is only audio, the system control 170 disables the remainder of the apparatus via line 301 and directs the audio data through the digital signal processing section 160 via line 107 to the speaker 180a or the audio output ports 180b, via line 304. This is done by sending a control signal 302a to the digital signal processing ("DSP") section 160 through line 301.

In an embodiment the alternative audio output ports 180b has at least two outputs which can be used to plug in headphones (not shown) or external speakers (not shown). When any or all of the alternative output ports are being used the speaker 180a is disabled and the audio signal is sent to the output port 180b that is in use.

If the information 100 is encoded MPEG-1 audio/video, the system control 170 sends a control signal 302b to the digital signal processing section 160 through line 301 which activates the system. The information 100 is sent to the digital signal processing section 160 via line 107. In an embodiment the system controller 170 is a W78E54 Host Microcontroller, supplied by Winbond Electronics Corporation of America, San Jose, Calif.

The digital signal processor 160 further processes the information and provides an encoded MPEG-1 audio signal 306a and an encoded MPEG-1 video signal 306b to the system control 170 through line 305.

A MPEG audio/video decoder 190 receives the information from the system control 170 via line 307 and decodes the encoded MPEG-1 audio signal 306a and the encoded MPEG-1 video signal 306b by use of an encryption decoder software contained within the MPEG audio/video processor 190 at DSP 100. It further restore-processes the decoded MPEG-1 audio signal 306a and the decoded MPEG-1 video signal 306b, and provides a digital decoded/decompressed audio signal 102 and video signal 106. In an embodiment, MPEG decoder includes a digital-to-analog converter ("DAC") for connecting the digital audio signal to an analog signal on line 105. In an embodiment the MPEG audio/video decoder 190 is a C-Cube CL484 MPEG-1 Decoder, available from C-Cube Micro-systems, Milpitas, Calif.

The decoded/decompressed audio signal 102 is sent to either the speaker 180a, or the alternative audio output ports 180b via line 105. The decoded/decompressed video signal 106 is sent to the control circuit board 320 through line 109. The control circuit board 320 provides a display signal 251 from the decoded/decompressed video signal on line 113 which is reproduced on the screen 260. The screen 260 is illuminated by a backlight module 1400 via line 117.

Figure 5:
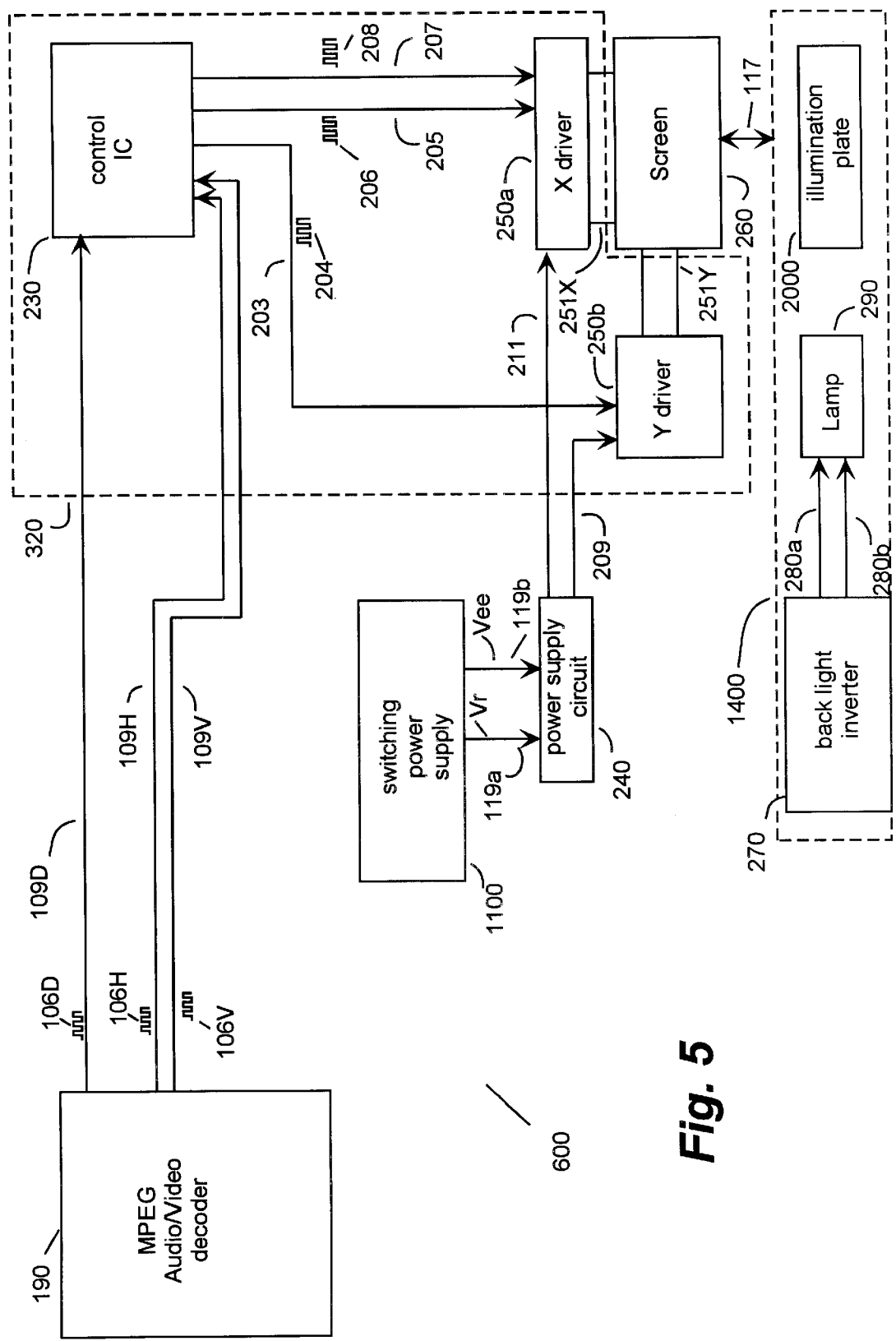
FIG. 5 is a block diagram of a digital video interface in an embodiment of the present invention.

FIG. 5, illustrates an expanded view of 190, 260, 320, 1100 and their interconnections as shown in FIG. 3. The MPEG audio/video decoder 190 provides the control circuit board 320 with a 8 bit data signal 106D, a horizontal synchronization signal 106H and a vertical synchronization signal 106V, through lines 109D, 109H, and 109V, respectively. The control IC 230 receives the data signal 106D, the vertical synchronization signal 106V and the horizontal synchronization signal 106H from the MPEG audio/video processor 190. The control IC 230 provides a X driver control signal 206 to the X driver 250*a*, a Y driver control signal 204 to the Y driver 250*b*, and a data signal 208 to the X driver 250*a*, through lines 205, 203 and 207 respectively. The control IC 230, X driver 250*a*, and the Y driver 250*b* are located on the control circuit board 320.

A switching power supply 1100 provides power to player 600 including screen 260. In particular, switching power supply 1100 provides a $V_r$ through line 119*a* and a $V_{ee}$ through line 119*b* to the power supply circuit 240. The power supply circuit 240 powers the X driver 250*a* and the Y driver 250*b* through lines 211 and 209, respectively.

The X driver 250*a* and the Y driver 250*b* power the corresponding pixels on the screen 260 via lines 251X and 251Y, respectively. This powering is done in response to the data signal 208, the X control signal 206 and the Y control signal 204. In an embodiment, the screen 260 is an Epson Liquid Crystal Display ("LCD") LB39ME supplied by Epson Hong Kong Limited, Wanchai, Hong Kong.

The screen 260 is illuminated by a backlight module 1400 which selects the amount of power supplied to the backlight thereby conserving battery life. The backlight module 1400 comprises a lamp 290 an illumination plate 2000 and is powered by a backlight inverter 270 through lines 280*a* and 280*b*. If the VCD player is using AC power the backlight module 1400 allows full power to the illumination plate 2000. If the VCD player is using DC (battery) power the output to the illumination plate 2000 is limited to approximately ⅔ maximum power. This is done by the use of a sensor which monitors the power source to determine whether the power source is AC or DC and adjust the backlight power accordingly. In an embodiment, a mechanical switch is coupled to the AC input jack. The mechanical switch is also coupled to system control 170. If the switch is closed upon insertion of an AC plug, a signal is generated to system control 170. Switching power supply 1100 then receives a signal from system control 170 for selecting AC power input and disables DC power input. This switching of power input sources further saves battery life. The backlight module also includes a brightness dial for adjusting the illumination provided to the display device form the illumination plate. When the brightness dial is turned all the way up the illumination will still be limited to ⅔ maximum power if the VCD player is using DC power.

Figure 4:
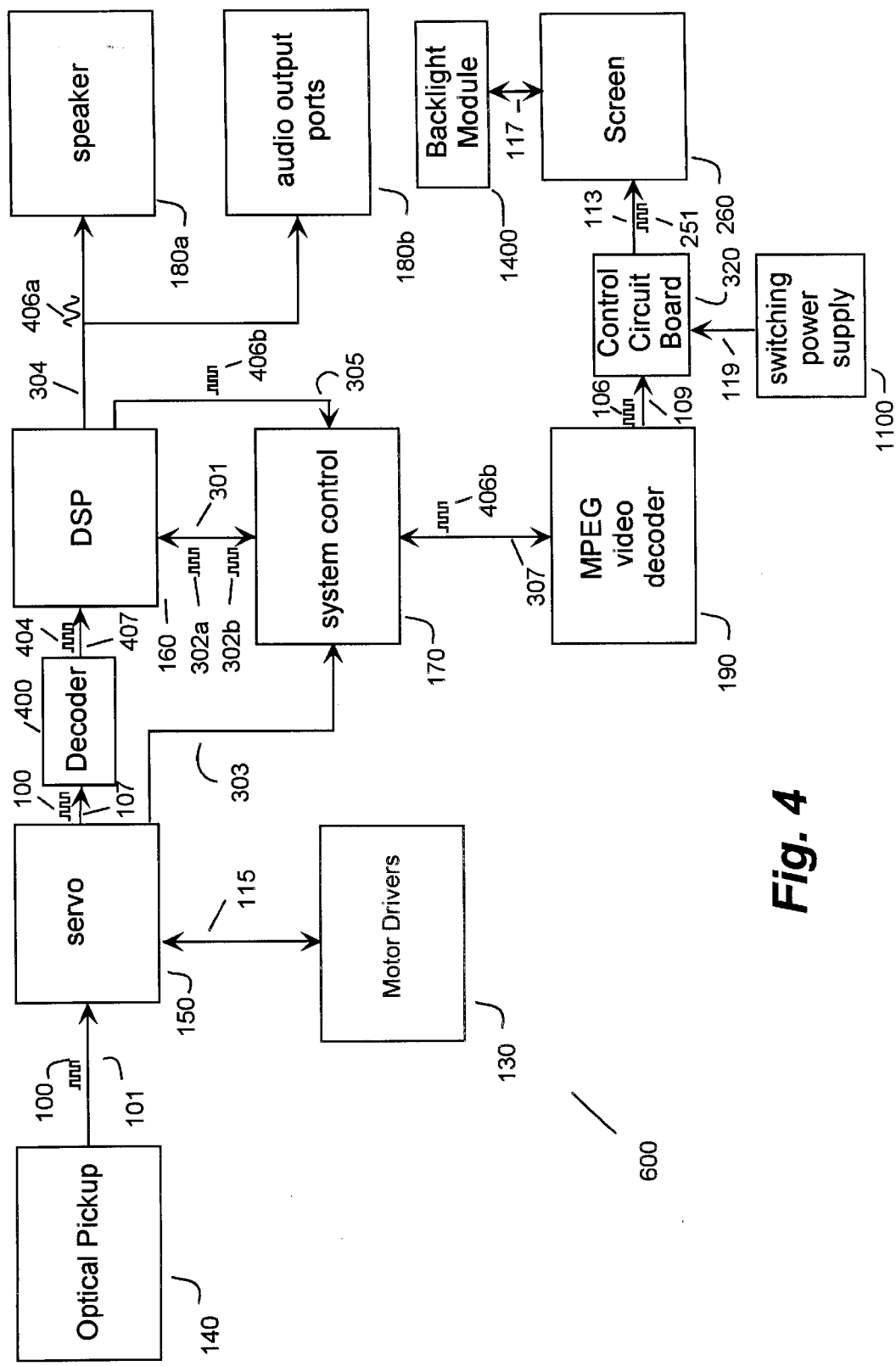
FIG. 4 is a block diagram of a VCD player having an encryption decoder in accordance with an embodiment of the present invention.

FIG. 4 has similar components as illustrated in FIG. 3 as discussed above. FIG. 4 illustrates an embodiment of an encryption decoder device 400 and a VCD player 600 for reading copy protected VCD's.

The encryption decoder device 400 decodes the encoded MPEG-1 audio/video signal 100 and provides a decoded MPEG-1 audio/video signal 404 to the digital signal processing section 160 through line 407. In an embodiment the encryption decoder device 400 is a Video Output & PCM1717 Audio DAC Output supplied by Burr-Brown, Tucson, Ariz.

Figure 6:
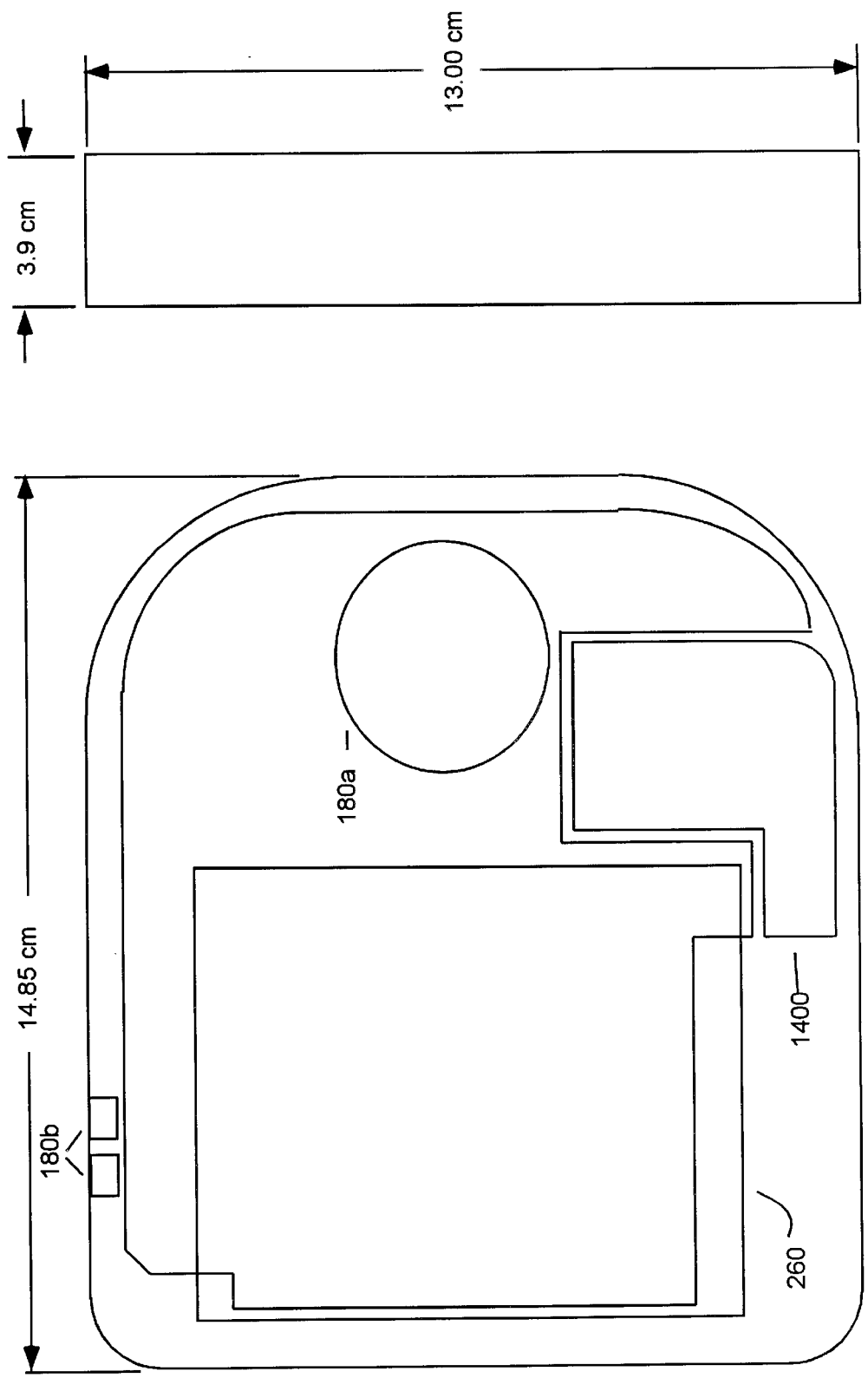
FIG. 6 is a schematic of a VCD player providing the dimensions in accordance with an embodiment of the present invention.

FIG. 6 shows a schematic diagram of an embodiment of a portable VCD player 600 with the positioning of the speaker 180*a*, the audio output ports 180*b*, the display 260 and the backlight module 1400. In an embodiment of the current invention the VCD player 600, in its closed position, is approximately 14.85 cm×approximately 13.00 cm×approximately 3.9 cm.

Figure 1:
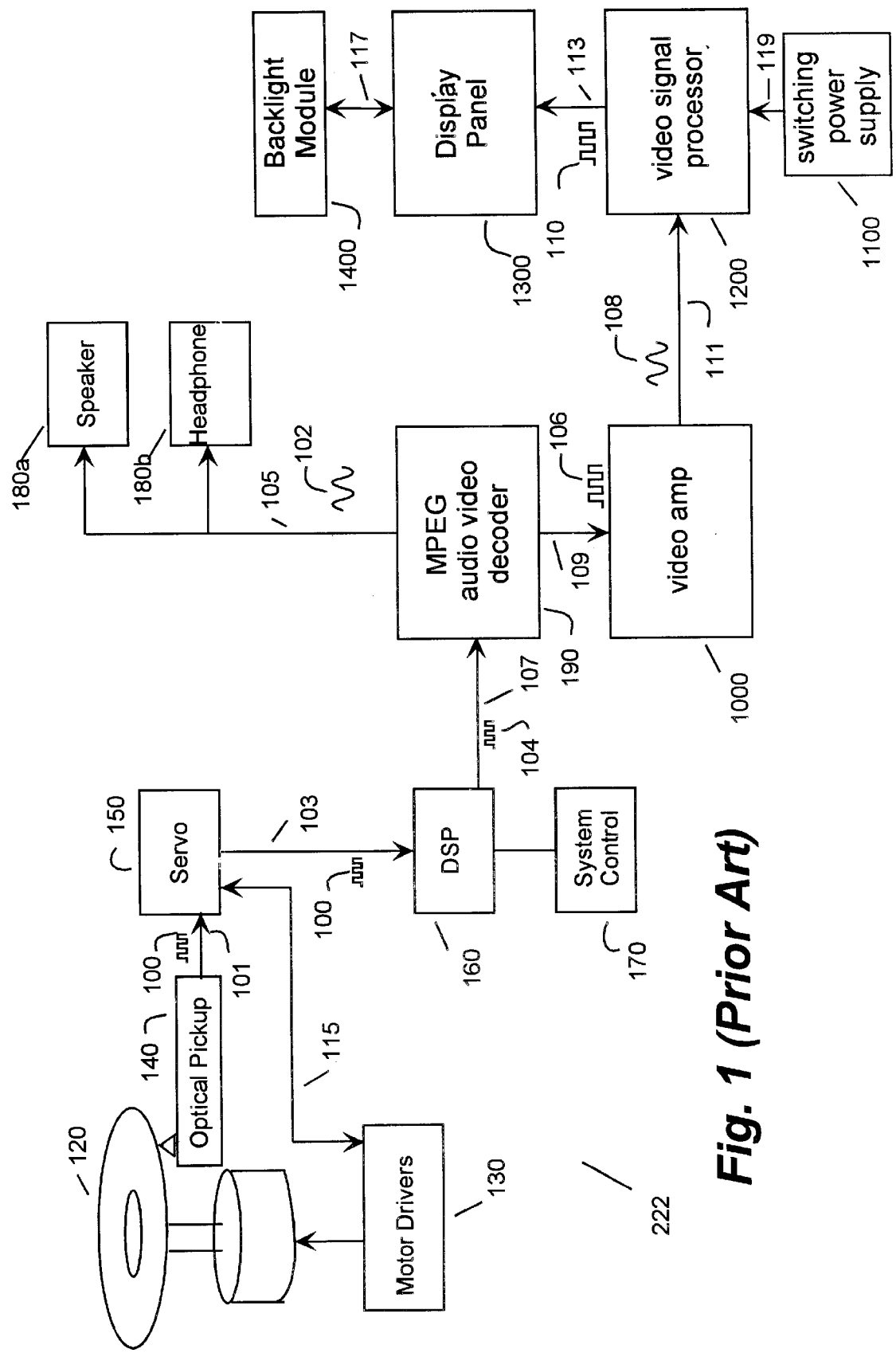
FIG. 1 is a block diagram of a typical VCD player in accordance with the prior art.
Figure 2:
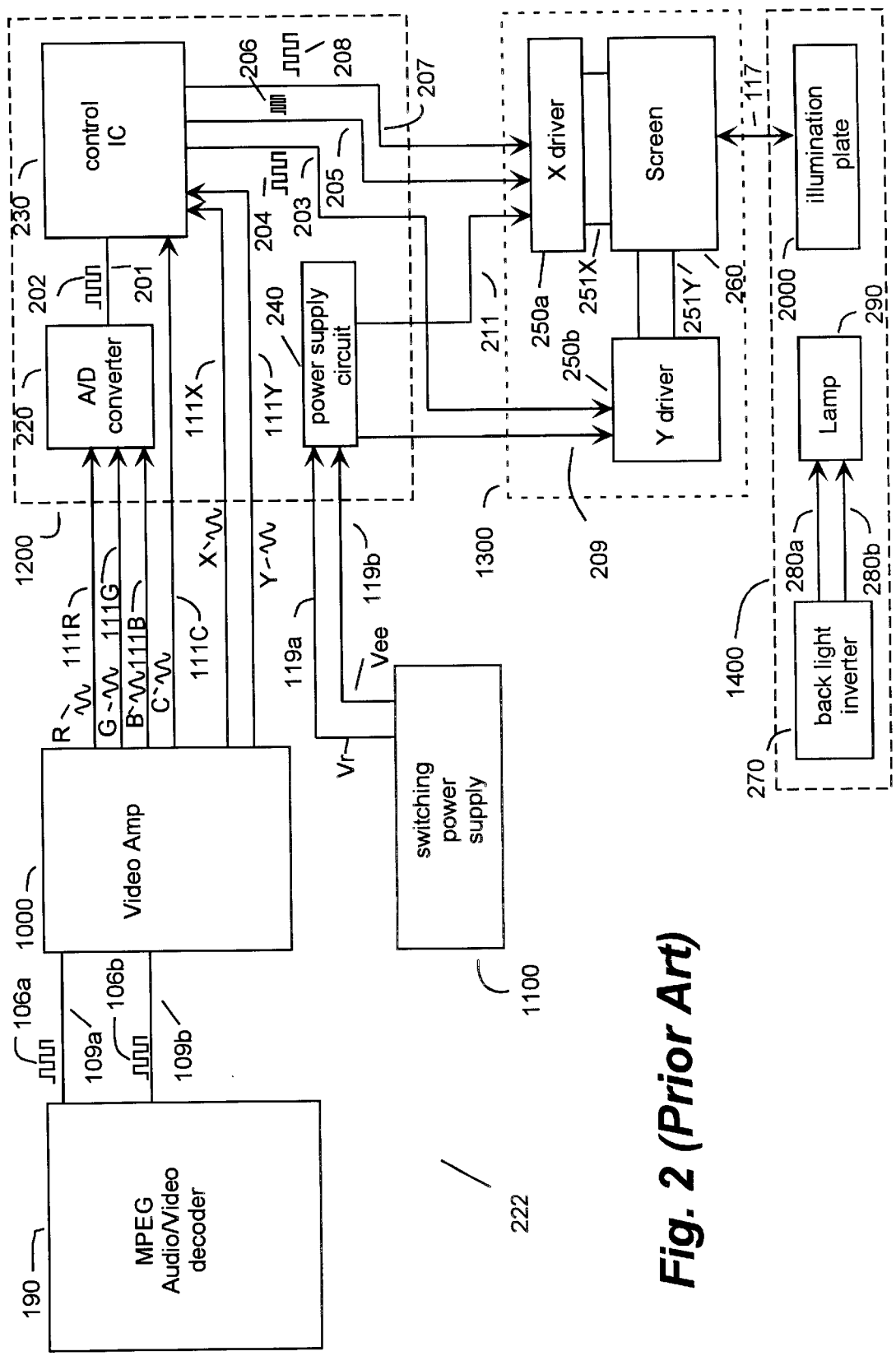
FIG. 2 is a block diagram of a typical analog video interface in accordance with the prior art.

As can be seen, an embodiment of the present invention eliminates semiconductor devices and/or circuits used in a typical VCD player. For example the VCD player 222 shown in FIG. 2 includes a video amp 1000 and an A/D converter 220. By eliminating the video amp 1000 and the A/D converter 220 there is no longer a need to convert the digital information supplied from the VCD to an analog signal, as is currently done in a typical VCD player. This elimination further helps in reducing the overall cost in producing the VCD player.

Another advantage of an embodiment of the current invention is incorporating the X driver 250*a* and the Y driver 250*b* into the control circuit board 320, as seen in FIG. 5. This reduces the overall size of the device and the distance between semiconductor devices. As discussed previously the reduction in distance between devices reduces the amount of unwanted electromagnet radiation emitting from the VCD player 600.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for reproducing information obtained from a compact disc, said apparatus comprising:
   a motor for rotating the compact disc;
   a read path for obtaining a digital readout signal from the compact disc, wherein the read path includes:
      a MPEG audio/video decoder for generating a digital video signal from the digital readout signal;
   a digital control circuit, coupled to the MPEG audio/video decoder, for receiving the digital video signal and generating a digital display signal in response to the digital video signal; and,
   a display, coupled to the control circuit, for outputting video in response to the digital display signal.

2. The apparatus of claim 1, further being portable.

3. The apparatus of claim 1, wherein the compact disc is 12 cm in diameter.

4. The apparatus of claim 1, wherein the information is compressed using MPEG-1 technology.

5. The apparatus of claim 1, wherein the control circuit reduces electromagnetic radiation.

6. The apparatus of claim 1, wherein the control circuit comprises:
   a control IC for receiving the digital video signal from the MPEG audio/video decoder, for separating the digital video signal provided from the MPEG audio/video decoder, and for providing an X signal, a Y signal and a data signal;
   an X driver, coupled to the control IC, for providing a signal to the display in response to the X signal and the data signal; and,
   a Y driver, coupled to the control IC, for providing a signal to the display in response to the Y signal.

7. The apparatus of claim 6, wherein the control IC comprises:
   a plurality of inputs for receiving 1) a digital data signal, 2) a digital horizontal synchronization signal, and 3) a digital vertical synchronization signal; and, a plurality of outputs for producing 1) a digital data signal, 2) a digital X driver control signal, and 3) a digital Y driver control signal.

8. The apparatus of claim 6, wherein the digital data signal is an eight bit data signal.

9. An apparatus for reproducing information obtained from a compact disc, said apparatus comprising:

a motor for rotating the compact disc;

a read path for obtaining a digital readout signal from the compact disc, wherein the read path includes;

an encryption decoder device for generating a digital decoded signal from the digital readout signal;

a MPEG audio/video decoder, coupled to the encryption decoder device, for generating a digital video signal from the digital decoded signal;

a digital control circuit, coupled to the MPEG audio/video decoder, for receiving the digital video signal and generating a digital display signal in response to the digital video signal; and, a display device, coupled to the digital control circuit, for outputting an image in response to the digital display signal.

10. The apparatus of claim 9, further being portable.

11. The apparatus of claim 9, wherein the compact disc is 12 cm in diameter.

12. The apparatus of claim 9, wherein the information is compressed using MPEG-1 technology.

13. The apparatus of claim 9, wherein the encryption decoder device is connected between a servo and a digital signal processor.

14. An apparatus for reproducing information obtained from a compact disc, said apparatus comprising:

a motor for rotating the compact disc;

a read path for obtaining an encrypted digital readout MPEG signal from the compact disc, wherein the read path includes;

a MPEG audio/video decoder, for generating a digital video signal from the digital readout signal, wherein the MPEG audio/video decoder includes software for decrypting the readout signal;

a digital control circuit, coupled with the MPEG audio/video decoder, for receiving the digital video signal and generating a digital display signal in response to the digital video signal, and;

a display device, coupled to the digital control circuit, for outputting an image in response to the digital display signal supplied from the digital control circuit.

15. A video compact disc player for providing video obtained from a video compact disc, said apparatus comprising:

a motor for rotating the video compact disc;

a digital only read path for obtaining a digital readout signal from the video compact disc;

a display device, coupled to the read path, for outputting the video supplied from the read path; and, a backlight module, coupled to the display device, for selecting the amount of power provided to the display device.

16. The compact disc player of claim 15, wherein the backlight module comprises a sensor for monitoring the source of a power supply.

17. The compact disc player of claim 15, wherein the backlight module comprises a brightness dial for adjusting the illumination provided to the display device from the illumination plate.

18. The player of claim 15, wherein the backlight module further comprises:

a backlight invertor for suppling power to the backlight;

a lamp, coupled to the backlight inverter, for producing a light; and, an illumination plate for receiving the light from the lamp and illuminating the display device.

19. The player of claim 15, further being portable.

20. The player of claim 15, wherein the compact disc is 12 cm in diameter.

21. The player of claim 15, wherein the information is compressed using MPEG-1 technology.

22. A MPEG-1 video compact disc player, comprising:

a motor for rotating a 12 cm video compact disc;

a read path for obtaining a read signal from the compact disc, wherein the read path includes:

a MPEG decoder for generating a decoded digital video signal from the read signal;

a digital control circuit, coupled to the MPEG decoder, for receiving the decoded digital video signal and generating a digital display signal in response to the decoded digital video signal;

a display, coupled to the control circuit, for outputting video in response to the digital display signal;

a battery for providing power to the player;

a backlight module, coupled to the display, for minimizing the output of power provided by the battery.

23. The player of claim 22, wherein the control circuit includes a X driver and a Y driver.

24. A portable MPEG-1 video compact disc player for reproducing information obtained from a video compact disc, comprising:

a motor for rotating the compact disc;

a read path for obtaining a digital readout signal from the compact disc, wherein the read path includes:

a system control circuit for determining if the digital readout signal is audio or audio/video and controlling the destination of the digital readout signal;

an audio output device, coupled to the system control, for outputting audio information responsive to the audio signal;

a MPEG audio/video decoder, coupled with the system control, for generating a digital video signal from the digital readout signal, wherein the digital video signal includes a digital data signal, a digital horizontal synchronization signal, and a digital vertical synchronization signal; and, a digital control circuit, coupled to the MPEG audio/video decoder, for generating a digital display signal in response to the digital video signal, wherein the digital control circuit includes:

a control IC for separating the digital video signal provided from the MPEG audio/video decoder, and for providing an X signal, a Y signal and a data signal, wherein the control IC includes:

a plurality of inputs for receiving 1) the digital data signal; 2) the digital horizontal synchronization signal, and 3) the digital vertical synchronization signal; and, a plurality of outputs for producing 1) the digital data signal, 2) a digital X driver control signal, and 3) a digital Y driver control signal;

an X driver, coupled to the control IC, for providing a digital X display signal in response to the digital X driver control signal and the digital data signal; and, a Y driver, coupled to the control IC, for providing a digital Y display signal in response to the digital Y driver control signal; and, a display, coupled to the read path, outputting video responsive to the digital data signal, the digital X display signal and the digital Y display signal.

25. The apparatus of claim 24, wherein the read path further includes, an encryption decoder device, for decoding an encrypted digital readout signal and providing a decoded digital readout signal to the system control.

26. The apparatus of claim 24, further comprising:

a backlight module, coupled to the display device, for selecting the amount of power provided to the display device, wherein the backlight module includes:

a sensor for monitoring the source of a power supply;

a backlight invertor for suppling power to the backlight;

a lamp, coupled to the backlight inverter, for producing a light; and, an illumination plate for receiving the light from the lamp and illuminating the display device.

* * * * *

UNITED STATES PATENT AND TRADEMARK OFFICE
CERTIFICATE OF CORRECTION

PATENT NO. : 6,418,273 B1
DATED : July 9, 2002
INVENTOR(S) : Lubinski et al.

It is certified that error appears in the above-identified patent and that said Letters Patent is hereby corrected as shown below:

<u>Column 10,</u>
Line 9, delete "suppling" and insert therefor -- supplying --

Signed and Sealed this

Eighteenth Day of February, 2003

JAMES E. ROGAN
*Director of the United States Patent and Trademark Office*